(12) United States Patent
Yang et al.

(10) Patent No.: US 8,036,369 B2
(45) Date of Patent: Oct. 11, 2011

(54) METHOD AND SYSTEM FOR REALIZING DIRECT DIALING TO AN EXTENSION ACROSS PBXS

(75) Inventors: Shaoming Yang, Shenzhen (CN); Hanbing Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1299 days.

(21) Appl. No.: 11/631,767

(22) PCT Filed: Nov. 1, 2005

(86) PCT No.: PCT/CN2005/001811
§ 371 (c)(1),
(2), (4) Date: Jan. 4, 2007

(87) PCT Pub. No.: WO2006/108328
PCT Pub. Date: Oct. 19, 2006

(65) Prior Publication Data
US 2008/0075266 A1    Mar. 27, 2008

(30) Foreign Application Priority Data

Apr. 14, 2005  (CN) .......................... 2005 1 0064281

(51) Int. Cl.
*H04M 7/00* (2006.01)

(52) U.S. Cl. ........ 379/233; 379/231; 379/232; 379/234; 379/225; 379/224

(58) Field of Classification Search .................. 379/234, 379/207, 220, 225, 258, 216.01
See application file for complete search history.

(56) References Cited

U.S. PATENT DOCUMENTS

| | | | | |
|---|---|---|---|---|
| 3,160,713 A * | 12/1964 | Williford | ....................... | 379/234 |
| 4,600,812 A * | 7/1986 | Gerlits | ..................... | 379/216.01 |
| 5,339,356 A | 8/1994 | Ishii | .............................. | 379/234 |
| 5,646,985 A * | 7/1997 | Andruska et al. | .......... | 379/265.1 |
| 6,950,507 B1 * | 9/2005 | Kaplan | .................... | 379/142.01 |
| 2003/0123639 A1 * | 7/2003 | Lee | ................. | 379/258 |

FOREIGN PATENT DOCUMENTS

JP    2004320381    11/2004

(Continued)

OTHER PUBLICATIONS

English language translation of Written Opinion for PCT/CN2005/001811.

(Continued)

*Primary Examiner* — Curtis Kuntz
*Assistant Examiner* — Joseph J Nguyen
(74) *Attorney, Agent, or Firm* — Ladas & Parry, LLP

(57) ABSTRACT

Embodiments of the present invention disclose a method for realizing direct dialing to an extension across Private Branch Exchanges (PBXs), in witch firstly a calling terminal of a PBX seizes a PBX circuit; secondly the calling terminal initiates a call to a called extension terminal in a PBX cluster by dialing a called extension terminal number directly; then a exchange system resolves the number of the PBX switchboard to which the calling terminal belongs according to a calling terminal number, and obtains a number of the PBX switchboard to which a called extension terminal belongs according to information of the called extension terminal number; and then the exchange system initiates a call to the PBX switchboard to which the called extension terminal belongs, and, when receiving an answer to the call from the PBX switchboard, sends the called extension terminal number, to connect the calling terminal with the called extension terminal.

20 Claims, 4 Drawing Sheets

FOREIGN PATENT DOCUMENTS

KR        2002053236        7/2002

OTHER PUBLICATIONS

Jul. 7, 2008 European Office Action for application No. 05803826.6.

Apr. 8, 2010 European Office Action for application No. 05803826.6.

Feb. 27, 2009 Malaysian Office Action for application No. PI20061674.

Oct. 29, 2010 Malaysian Office Action for application No. PI20061674.

Jul. 16, 2008 European Office Action for application No. 05803826.6.

* cited by examiner

METHOD AND SYSTEM FOR REALIZING DIRECT DIALING TO AN EXTENSION ACROSS PBXS

FIELD OF THE INVENTION

The present invention relates to management of calling across Private Branch Exchanges (PBXs), in particular to a method for realizing direct dialing to an extension across PBXs and a system for the same.

BACKGROUND OF THE INVENTION

Among existing communication equipments, PBX is widely used for internal communication in a business consortium. However, a consortium often has branches in different cities or a same city, wherein each branch accesses to telecom network via a PBX. For communication between two branches, the calling party has to dial the PBX switchboard number of the called party, and then dial the extension number after listening to a voice prompt.

Hereunder the communication flow between users of different PBXs in a consortium is explained by way of example. It is assumed that the consortium has a branch in location A, whose internal communication is managed by a PBX with a switchboard number of 02188888888 and an outgoing call prefix of 0, and a short number of employee S1 in which branch is 210011; and another branch in location B, whose internal communication is also managed by a PBX with a switchboard number of 01022222222 and an outgoing call prefix of 0, and a short number of employee B1 in which branch is 10001. The flow of employee S1 calling employee B1 is shown in FIG. 1, as follows:

1. employee S1 lifts off the hook and dials 0 to seize a PBX circuit;
2. after hearing a second dial tone, employee S1 dials the switchboard number 01022222222;
3. after analyzing the number, the system determines to route the call to location B, and then the terminal office in location B routes the call to the corresponding PBX;
4. the PBX in location B plays back a voice prompt "please dial the extension number";
5. employee S1 dials employee B1's extension number 10001;
6. the PBX in location B rings B1' extension, and then B1 picks up the phone to talks with S1.

With the above method, when users of different PBXs in a same consortium call each other, the calling party has to dial the number of the PBX switchboard to which the called party belongs and then dial the extension number of the called party, resulting in dialing complexity and reduced communication efficiency.

Though the existing Wide Area Centrex (WAC) service can provide prompt short-number dialing service for branches of a consortium in different locations, it can only allocate short numbers for a PBX switchboard number. To call each other, users of different PBXs still need to dial the short switchboard number firstly and then dial the extension number of the called party. Hereunder a WAC-controlled communication flow between users of different PBXs in a consortium is explained by way of example:

It is assumed that the consortium has a branch in location A, whose internal communication is managed by a PBX with the switchboard number as 02188888888 and the outgoing call prefix as 0, and the short number of employee S1 in which branch is 210011; and another branch in location B, whose internal communication is also managed by a PBX with a switchboard number of 01022222222 and an outgoing call prefix of 0, and the short number of employee B1 in which branch is 10001; and the switchboard numbers of branch A and B are both incorporated into the consortium's WAC, wherein the short WAC number of the PBX in location A is 218888, and that of the PBX in location B is 106666. The flow of employee S1 calling employee B1 is shown in FIG. 2, as follows:

1. employee S1 in location A lifts off the hook and dials 0 to seize a PBX circuit;
2. after hearing a second dial tone, employee S1 dials the switchboard number 106666 of location B;
3. after analyzing the number, the system determines to route the call to location B, and then the terminal office in location B routes the call to the corresponding PBX;
4. the PBX in location B plays back a voice prompt "please dial the extension number";
5. employee S1 dials the extension number 10001 of employee B1;
6. the PBX in location B rings B1' extension, and then B1 picks up the phone to talks with S1.

It is seen that when users of different PBXs in a same consortium call each other, the calling party still has to dial the short WAC number of the PBX switchboard to which the called party belongs and then dial the extension number, by which only the switchboard number is abbreviated by several digitals, therefore the problem of complex dialing and low communication efficiency is not solved radically.

SUMMARY OF THE INVENTION

Embodiments of the present invention provide a method for realizing direct dialing to an extension across PBXs and a system for the same.

The method for realizing direct dialing to an extension across PBXs includes the following steps:

seizing, by a calling terminal of a PBX, a PBX circuit;

and initiating a call to a called extension terminal in a PBX cluster by dialing the number of the called extension terminal directly;

resolving, by a exchange system, the number of the PBX switchboard to which the calling terminal belongs according to the number of the calling terminal, and obtaining the number of the PBX switchboard to which the called extension terminal belongs according to the information of the number of the called extension terminal;

initiating by the exchange system a call to the PBX switchboard to which the called extension terminal belongs, and, when receiving an answer to the call from the PBX switchboard, sending the called extension terminal number, to connect the calling terminal with the called extension terminal.

The system for realizing direct dialing to an extension across PBXs includes a device for a calling terminal of a PBX to seize a PBX circuit, and a device for initiating a call to a called extension terminal in a PBX cluster by dialing the number of the called extension terminal directly; and further includes:

a first calling device, for resolving the number of the PBX switchboard to which the calling terminal belongs according to the number of the calling terminal, and obtaining the number of the PBX switchboard to which the called extension terminal belongs according to information of the number of the called extension terminal;

a second calling device, for initiating a call to the PBX switchboard to which the called extension terminal belongs, and sending the called extension terminal number subsequent to receiving an answer to the call from the PBX switchboard to connect the calling terminal with the called extension terminal.

With the embodiments of the present invention, users of different PBXs can initiate calls to each other by dialing short numbers directly rather than the PBX extension numbers of the called party; in addition, the short numbers can be allocated in accordance with job numbers, so as to reduce communication load and improve working efficiency.

DETAILED DESCRIPTION OF THE EMBODIMENTS

In order to support initiating calls for users of different PBXs in the same consortium by dialing the extension number of the called user directly, in an embodiment of the present invention all PBXs are treated as a particular PBX cluster for management. Each PBX corresponds to a PBX switchboard number (or referred to as "PBX pilot number"), i.e., the number open to the public (e.g., 28780808). The PBX cluster can manage a plurality of PBX switchboard numbers, wherein several cluster prefixes can be defined for one PBX cluster, and PBXs in the PBX cluster have intra-cluster prefixes different from each other.

A number mapping relationship of a PBX cluster is established in the communication system in accordance with the prevent invention. The number mapping relationship may be a mapping relationship between intra-cluster prefixes and PBX switchboard numbers, and the corresponding PBX switchboard number can be looked up via the intra-cluster prefix when users of different PBXs in the same consortium initiate calls to each other by dialing the extension number of the called party directly, and thus the call can be routed. Alternatively, the number mapping relationship may be a mapping relationship between PBX switchboard numbers and extension numbers, and the corresponding PBX switchboard number can be looked up via the intra-cluster extension number when users of different PBXs in the same consortium initiate calls to each other by dialing the extension number of the called party directly, and thus the call can be routed.

A mapping between intra-cluster prefixes and PBX switchboard numbers is shown in the following table:

TABLE 1

| Cluster No. | Intra-cluster Prefix | PBX Switchboard number |
|---|---|---|
| 1 | 21 | 02188888888 |
| 1 | 10 | 01022222222 |
| 1 | 20 | 020666666666 |

A mapping between intra-cluster extension numbers and PBX switchboard numbers is shown in the following table:

TABLE 2

| Cluster No. | Extension Number | PBX Switchboard number |
|---|---|---|
| 1 | 210011 | 02188888888 |
| 1 | 10001 | 01022222222 |
| 1 | 10003 | 01022222222 |

In the information shown in table 1 and 2, it is important that extension number contains intra-cluster prefix, such as the first and second digitals "21" as intra-cluster prefix of extension number 210011 and the first and second digitals "10" as intra-cluster prefix of extension number 10001.

The mapping tables described above can be configured in an exchange system as an application unit, designed for looking up the PBX to which the called party belongs via an internal interface.

Figure 1:
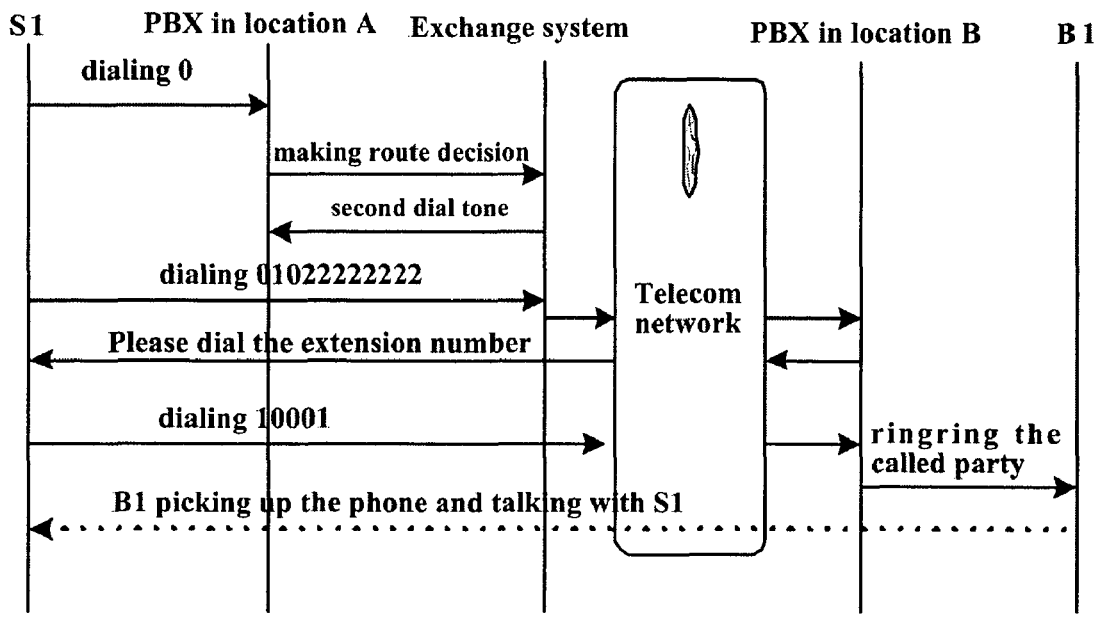
FIG. 1 is a schematic flow diagram of user calling across PBXs in the prior art.
Figure 2:
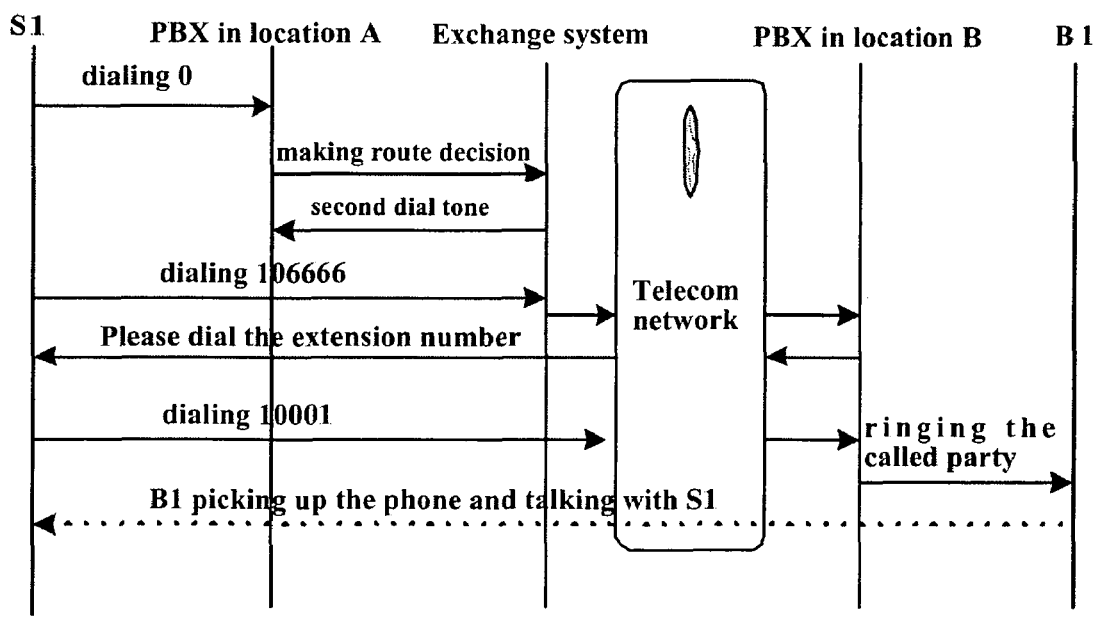
FIG. 2 is a schematic flow diagram of user calling across PBXs in WAC service in the prior art.
Figure 3A:
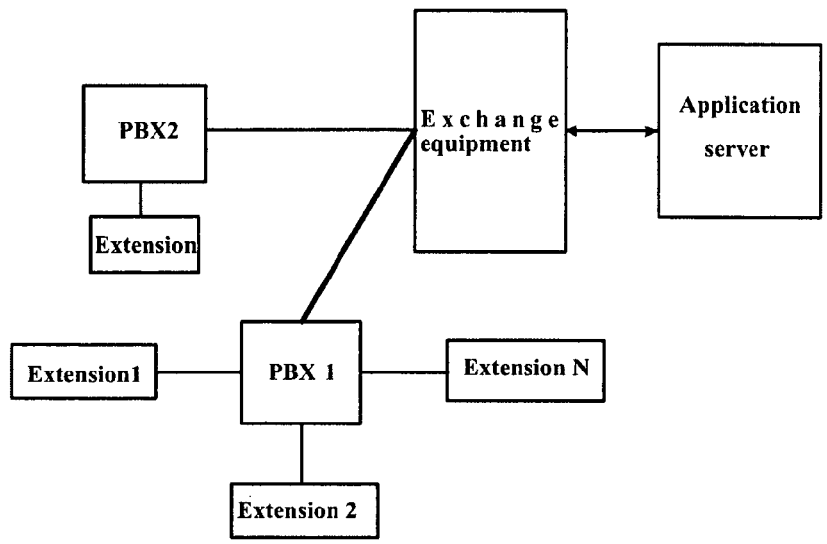
FIG. 3A is a structural diagram of a communication system according to an embodiment of the present invention.

Alternatively, a separate application server configured with the above mapping tables may be added into the communication system, as shown in FIG. 3A, and the exchange system interacts with the application server via MAP or ISUP protocol.

Figure 3B:
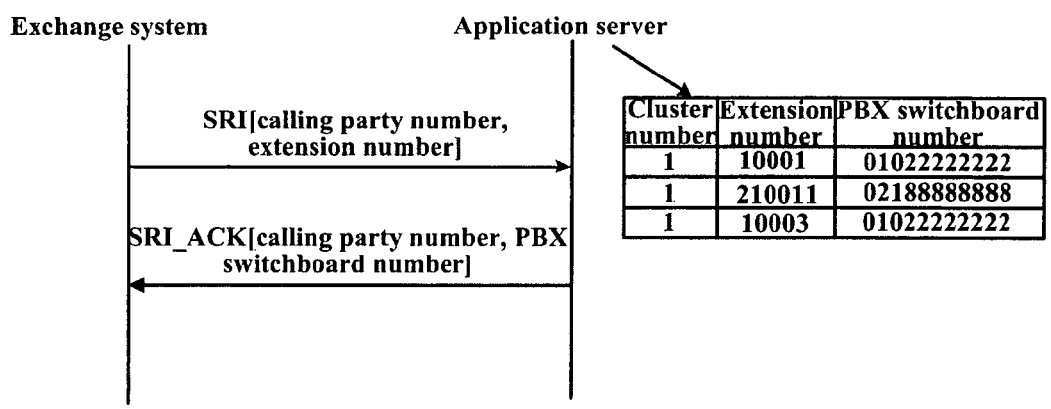
FIGS. 3B and 3C is a schematic diagram showing a exchange system interacting with an application server to query the number of the PBX switchboard to which the called party belongs.

As shown in FIG. 3B, during the interaction via MAP protocol, the exchange system sends a Send Routing Information (SRI) message carrying calling party number and called party number to the application server; and the application server returns back the number of the PBX switchboard to which the called party belongs via an SRI_ACK message after querying.

Figure 3C:
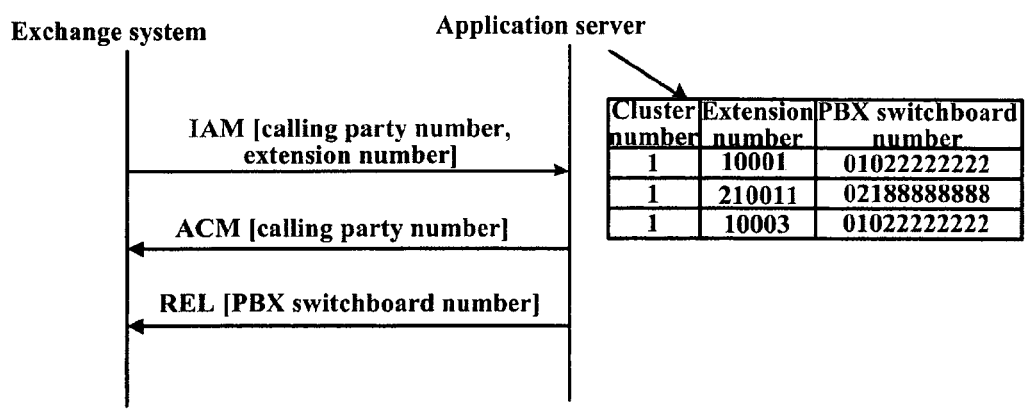

As shown in FIG. 3C, during the interaction via ISUP protocol, the exchange system sends an Initial Address Message (IAM) carrying calling party number and called party number to the application server; and the application server returns back the calling party number via an Address Complete Message (ACM) and the number of the PBX switchboard to which the called party belongs via a Release (REL) message after querying.

Figure 3D:
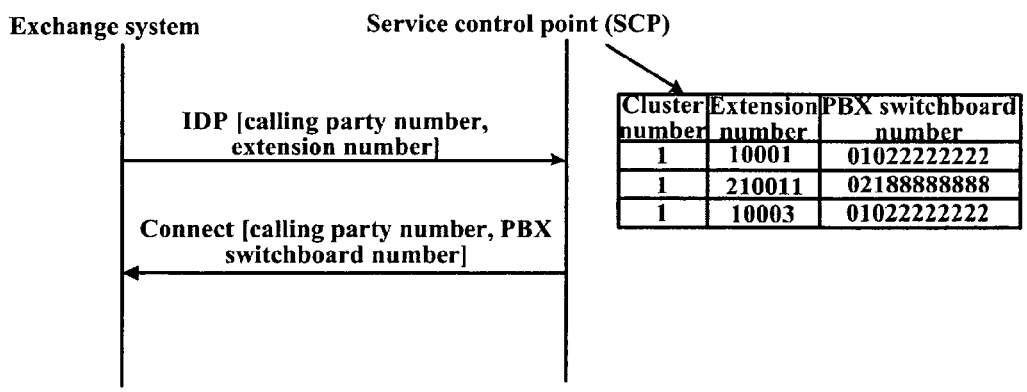
FIG. 3D is a schematic diagram showing a exchange system interacting with a service control point to query the number of the PBX switchboard to which the called party belongs.

Alternatively, the mapping tables described above can configured in a Service Control Point (SCP) of intelligent network, as shown in FIG. 3D, and the exchange system interacts with the SCP via Intelligent Network Application Protocol (INAP). When receiving a call initiated by a PBX user of a consortium to another user of the same consortium from a different PBX, the exchange system sends an Initial Detection Point (IDP) message carrying the calling party number and the called party number to the SCP; and after querying, the SCP returns back the number of the PBX switchboard to which the called party belongs via Connect command.

In order to be adapted to different types of PBXs, playback preparation durations (i.e., the duration from the time the exchange system sends a call to a PBX to the time the voice playback by the PBX is received by the exchange system) vary with different PBXs, thus being configured in exchange systems in accordance with parameters offered by PBXs.

Figure 4:
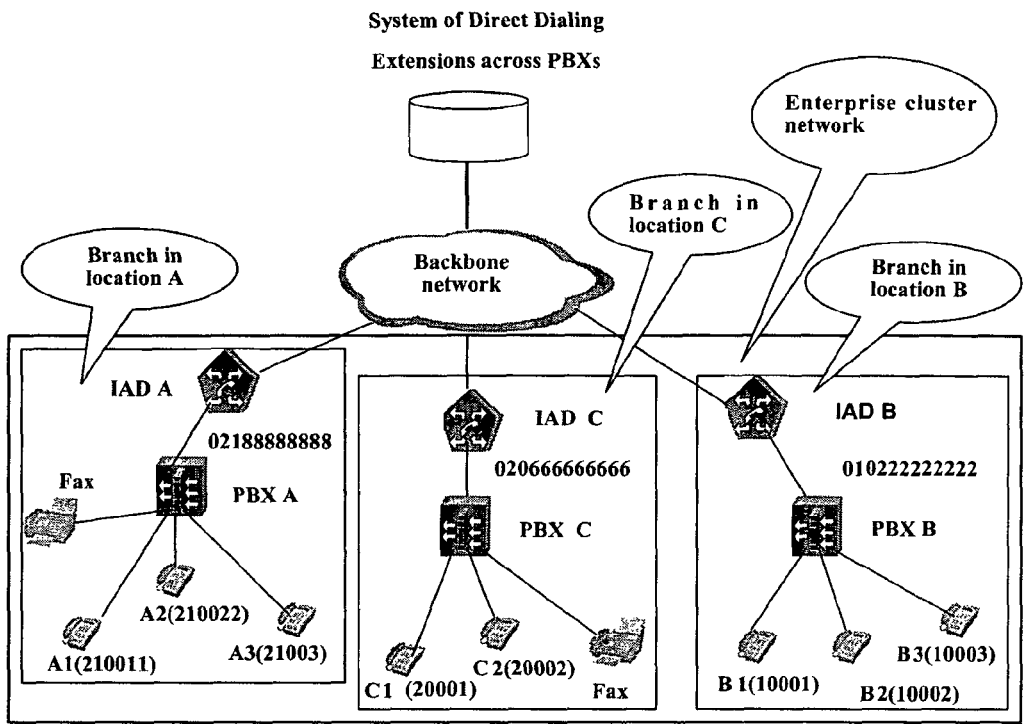
FIG. 4 is a schematic diagram of the network structure with different PBXs in a consortium.

As shown in FIG. 4, there are (but not limited to) three PBXs of PBX A, PBX B, and PBX C in an enterprise cluster network, and those are connected through a backbone network. The internal communication of the branch in location A is managed by PBX A, wherein the PBX A has a switchboard number of 02188888888 and an outgoing call prefix of 0, and the short number of employee A1 of the branch in location A is 210011; and the internal communication of the branch in location B is managed by PBX B, wherein the PBX B has a switchboard number of 01022222222 and an outgoing call prefix of 0, and the short number of employee B1 of the branch in location B is 10001.

Figure 5:
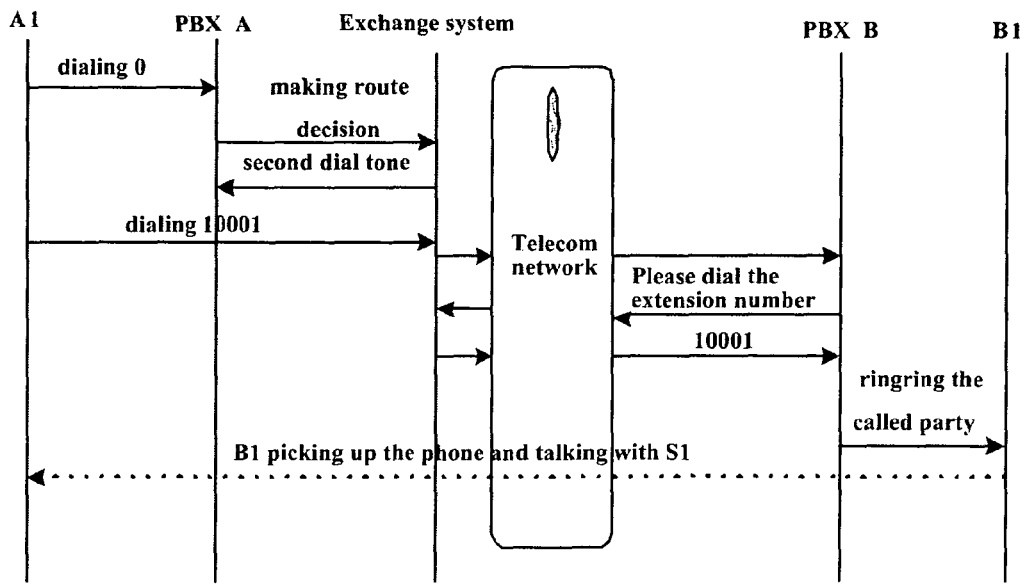
FIG. 5 is a flow diagram of user calling across PBXs according to an embodiment of the present invention.

As shown in FIG. 5, the flow of employee A1 calling employee B1 is as follows:

1. employee A1 belonging to PBX A in location A, with a extension number 210011, lifts off the hook and dial 0 to seize a PBX circuit;

2. when hearing a second dial tone, employee A1 dials the extension number 10001 of employee B1 in location B to initiate a call;

3. after analyzing the calling subscriber number and called subscriber number, the exchange system determines to route the call to location B, where the terminal office forwards the call to PBX B;

Wherein the exchange system determines the PBX cluster to which the calling subscriber belongs in according to the calling subscriber number "210011" (by the calling extension number, of "21" in this case), resolves the intra-cluster prefix "10" of the PBX cluster to which the called subscriber belongs according to the called subscriber's extension number, gets the number "01022222222" (as indicated in the above mapping table) of the PBX switchboard to which the called subscriber belongs according to the intra-cluster prefix, and then chooses a subscriber line by polling or randomly to initiate the call to the PBX switchboard with this number.

4. PBX B answers the call and plays back a voice prompt; when receiving the answer signal from PBX B, the exchange system does not send an answer signal (i.e., indicating that the system is ready to play back a voice and notifying the opposite system to prepare the voice channel) to the calling side temporarily, that is, at this time the backward media channel is controlled;

5. the exchange system sends the extension number 10001 to an Integrated Access Device (IAD), i.e., IAD B, and establishes the backward media channel;

as PBXs receive signals in Dual Tone Multi-Frequency (DTMF) or Frequency Shift Keying (FSK) mode through the voice channel, the exchange system notifies the IAD to send the extension number in DTMF or FSK mode to PBX B;

6. when the calling subscriber hears the ring back tone of the extension of PBX B and subscriber B1 picks up the phone, the calling and the called parties begin to talk with each other.

In order to control the time of sending the extension number accurately, in the step 4 described above, when receiving the answer signal from PBX B, the exchange system activates a timer, of which the timing duration is set to be the same as the playback preparation duration of PBX B; when the timer times out, the exchange system will send the extension number of the called subscriber. The timing duration, of cause, can be longer than the playback preparation duration of the PBX as appropriate.

The PBX cluster is managed as a PBX cluster, having its special characteristics. When intra-cluster prefixes are configured, the system can select whether to delete the intra-cluster prefixes; if not, extension number sent by the system to the PBX will be the PBX extension number dialed directly by the calling subscriber; otherwise, extension number sent by the system to the PBX will be the number dialed by the calling subscriber with the intra-cluster prefix deleted; the problem of extension numbers of different small PBXs being redundant may be solved by deleting intra-cluster prefixes, which is a special case for direct-dialing of PBX extensions.

Embodiment of the present invention meet the demand for dialing across PBXs with short numbers, automatically accomplish both a long number dialing and a short number dialing through techniques such as short number recognition, media control, and DTMF signaling, and achieve dialing across PBXs with short numbers.

Apparently, those skilled in the art can easily make modifications and embellishments to the present invention, without departing from the spirit and scope of the present invention. However, any such modification or embellishment shall fall in the protective scope of the present invention.

What is claimed is:

1. A method for realizing direct dialing to an extension across Private Branch Exchanges (PBXs), comprising the following steps:
   seizing, by a calling terminal of a PBX, a PBX circuit, and initiating a call to a called extension terminal in a PBX cluster by dialing the number of the called extension terminal directly;
   resolving by a exchange system the number of the PBX switchboard to which the calling terminal belongs according to the number of the calling terminal, and obtaining the number of the PBX switchboard to which the called extension terminal belongs according to information of the number of the called extension terminal;
   initiating by the exchange system a call to the PBX switchboard to which the called extension terminal belongs, and, when receiving an answer to the call from the PBX switchboard, sending the called extension terminal number, to connect the calling terminal with the called extension terminal.

2. The method as recited in claim 1, wherein the number of the PBX switchboard to which the called extension terminal belongs is obtained according to a number mapping relationship between intra-cluster prefixes and PBX switchboard numbers, or according to a number mapping relationship between extension terminal numbers and PBX switchboard numbers.

3. The method as recited in claim 2, wherein when sending the called extension terminal number, the exchange system also determines whether to delete the intra-cluster prefix; if the intra-cluster prefix is to be deleted, the exchange system deletes it from the called extension terminal number and then sends the resulting number to the PBX switchboard to which the called extension terminal belongs; otherwise, the exchange system sends the extension terminal number dialed by the calling terminal to the PBX switchboard to which the called extension terminal belongs directly.

4. The method as recited in claim 1, wherein the number mapping relationship is configured in an exchange equipment and accessed to via an internal interface of the equipment when being queried; or the number mapping relationship is configured in an application server and accessed to through an interaction by the exchange system with the application server via MAP or ISUP protocol; or the number
   mapping relationship is configured in a Service Control Point (SCP) and accessed to through the interaction by the exchange system with the SCP via Intelligent Network Application Protocol (INAP).

5. The method as recited in claim 4, wherein when sending the called extension terminal number, the exchange system determines whether to delete the intra-cluster prefix; if the intra-cluster prefix is to be deleted, the exchange system deletes it from the called extension terminal number and then sends the resulting number to the PBX switchboard to which the called extension terminal belongs; otherwise, the exchange system sends the extension terminal number dialed by the calling terminal to the PBX switchboard to which the called extension terminal belongs directly.

6. The method as recited in claim 1, wherein the exchange system controls a backward media channel when receiving an answer to the call from the PBX switchboard to which the called extension terminal belongs, and establishes the backward media channel with the calling terminal after sending the called extension terminal number.

7. The method as recited in claim 6, wherein when sending the called extension terminal number, the exchange system determines whether to delete the intra-cluster prefix; if the intra-cluster prefix is to be deleted, the exchange system deletes it from the called extension terminal number and then sends the resulting number to the PBX switchboard to which the called extension terminal belongs; otherwise, the exchange system sends the extension terminal number dialed by the calling terminal to the PBX switchboard to which the called extension terminal belongs directly.

8. The method as recited in claim 1, wherein the exchange system activates a timer upon receiving an answer from the PBX switchboard to which the called extension terminal belongs, and sends the called extension terminal number to the PBX switchboard when the timer times out.

9. The method as recited in claim 8, wherein a timing duration of the timer is not shorter than a playback preparation duration of the PBX to which the called extension terminal belongs.

10. The method as recited in claim 9, wherein when sending the called extension terminal number, the exchange system also determines whether to delete the intra-cluster prefix; if the intra-cluster prefix is to be deleted, the exchange system deletes it from the called extension terminal number and then sends the resulting number to the PBX switchboard to which the called extension terminal belongs; otherwise, the exchange system sends the extension terminal number dialed by the calling terminal to the PBX switchboard to which the called extension terminal belongs directly.

11. The method as recited in claim 8, wherein when sending the called extension terminal number, the exchange system also determines whether to delete the intra-cluster prefix; if the intra-cluster prefix is to be deleted, the exchange system deletes it from the called extension terminal number and then sends the resulting number to the PBX switchboard to which the called extension terminal belongs; otherwise, the exchange system sends the extension terminal number dialed by the calling terminal to the PBX switchboard to which the called extension terminal belongs directly.

12. The method as recited in claim 1, wherein the exchange system notifies an Integrated Access Device (IAD) to send the extension terminal number to the PBX switchboard via Dual Tone Multi-Frequency (DTMF) signal or Frequency Shift Keying (FSK) signal.

13. The method as recited in claim 12, wherein when sending the called extension terminal number, the exchange system also determines whether to delete the intra-cluster prefix; if the intra-cluster prefix is to be deleted, the exchange system deletes it from the called extension terminal number and then sends the resulting number to the PBX switchboard to which the called extension terminal belongs; otherwise, the exchange system sends the extension terminal number dialed by the calling terminal to the PBX switchboard to which the called extension terminal belongs directly.

14. The method as recited in claim 1, wherein when sending the called extension terminal number, the exchange system also determines whether to delete the intra-cluster prefix; if the intra-cluster prefix is to be deleted, the exchange system deletes it from the called extension terminal number and then sends the resulting number to the PBX switchboard to which the called extension terminal belongs; otherwise, the exchange system sends the extension terminal number dialed by the calling terminal to the PBX switchboard to which the called extension terminal belongs directly.

15. The method as recited in claim 14, wherein the PBXs are managed as a PBX cluster which defines a plurality of cluster prefixes.

16. The method as recited in claim 1, wherein the calling terminal is an extension terminal.

17. A system for realizing direct dialing to an extension across Private Branch Exchanges (PBXs), comprising a device for a calling terminal of a PBX to seize a PBX circuit, and a device for initiating a call to a called extension terminal by dialing the number of the called extension terminal in a PBX cluster directly, wherein the system further comprises:
a first calling device, for resolving the number of the PBX switchboard to which the calling terminal belongs according to the number of the calling terminal, and obtaining the number of the PBX switchboard to which the called extension terminal belongs according to information of the number of the called extension terminal;
a second calling device, for initiating a call to the PBX switchboard to which the called extension terminal belongs, and sending the called extension terminal number subsequent to receiving an answer to the call from the PBX switchboard to connect the calling terminal with the called extension terminal.

18. The system as recited in claim 17, wherein the first and second calling devices both are built in the exchange system.

19. The method as recited in claim 18, wherein the PBXs are managed as a PBX cluster which defines a plurality of cluster prefixes.

20. The method as recited in claim 17, wherein the PBXs are managed as a PBX cluster which defines a plurality of cluster prefixes.

* * * * *